(12) United States Patent
Webster et al.

(10) Patent No.: US 10,680,755 B2
(45) Date of Patent: *Jun. 9, 2020

(54) DUAL MODE COMMUNICATION SYSTEMS AND METHODS

(71) Applicant: Intellectual Ventures I LLC, Wilmington, DE (US)

(72) Inventors: Mark A. Webster, Indian Harbor Beach, FL (US); Michael J. Seals, Melbourne, FL (US)

(73) Assignee: Intellectual Ventures I LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/134,110

(22) Filed: Sep. 18, 2018

(65) Prior Publication Data

US 2019/0260512 A1    Aug. 22, 2019

Related U.S. Application Data

(63) Continuation of application No. 13/628,424, filed on Sep. 27, 2012, now Pat. No. 10,103,845, which is a continuation of application No. 12/760,136, filed on Apr. 14, 2010, now Pat. No. 8,289,835, which is a
(Continued)

(51) Int. Cl.
| | |
|---|---|
| *H04L 1/06* | (2006.01) |
| *H04B 7/04* | (2017.01) |
| *H04B 7/06* | (2006.01) |
| *H04J 9/00* | (2006.01) |
| *H04L 1/04* | (2006.01) |

(Continued)

(52) U.S. Cl.
CPC .............. *H04L 1/06* (2013.01); *H04B 7/04* (2013.01); *H04B 7/0697* (2013.01); *H04J 9/00* (2013.01); *H04L 1/04* (2013.01); *H04B 7/0404* (2013.01); *H04L 27/2601* (2013.01)

(58) Field of Classification Search
CPC ..... H04L 1/12; H04L 25/0248; H04L 1/0656; H04L 5/0046; H04L 1/0003; H04L 1/0009; H04L 25/0208; H04W 28/06; H04W 24/00; H04W 52/42; H04W 28/18; H04B 7/0837; H04B 7/0613; H04B 7/0417; H04B 7/0632; H04B 7/0443
See application file for complete search history.

(56) References Cited

U.S. PATENT DOCUMENTS

| | | |
|---|---|---|
| 5,933,421 A | 8/1999 | Alamouti et al. |
| 6,127,971 A | 10/2000 | Calderbank et al. |
| 6,185,258 B1 | 2/2001 | Alamouti et al. |

(Continued)

FOREIGN PATENT DOCUMENTS

WO    WO-2005/062514    7/2005

OTHER PUBLICATIONS

Examination Report on EP Appl. 05734177.8, dated Aug. 5, 2011, 5 pages.

(Continued)

*Primary Examiner* — Jung Liu
(74) *Attorney, Agent, or Firm* — Foley & Lardner LLP

(57) ABSTRACT

Embodiments of dual mode communication systems and methods are disclosed. On system embodiment, among others, comprises logic configured to perform spatial multiplexing and expanded bandwidth signaling to data.

32 Claims, 6 Drawing Sheets

Related U.S. Application Data continuation of application No. 11/105,909, filed on Apr. 13, 2005, now Pat. No. 7,729,233.

(60) Provisional application No. 60/561,877, filed on Apr. 14, 2004.

(51) Int. Cl.
*H04B 7/0404* (2017.01)
*H04L 27/26* (2006.01)

(56) References Cited

U.S. PATENT DOCUMENTS

| | | | |
|---|---|---|---|
| 6,298,092 | B1 | 10/2001 | Heath et al. |
| 6,473,393 | B1 | 10/2002 | Ariyavisitakul et al. |
| 6,889,355 | B1 | 5/2005 | Calderbank et al. |
| 7,061,854 | B2 | 6/2006 | Tarokh et al. |
| 7,095,709 | B2 | 8/2006 | Walton et al. |
| 7,349,439 | B2 | 3/2008 | Lakkis |
| 8,289,835 | B2 | 10/2012 | Webster et al. |
| 2002/0067759 | A1* | 6/2002 | Ertel .................. H01Q 1/246 375/141 |
| 2002/0158801 | A1* | 10/2002 | Crilly, Jr. ............ G01S 13/74 342/378 |
| 2003/0003863 | A1* | 1/2003 | Thielecke ............ H04B 7/0417 455/39 |
| 2003/0156570 | A1* | 8/2003 | Alamouti ............ H04B 7/0837 370/347 |
| 2003/0235147 | A1* | 12/2003 | Walton .................. H04B 7/04 370/204 |
| 2004/0047426 | A1* | 3/2004 | Nissani Nissensohn .................. H04L 25/0204 375/259 |
| 2004/0136349 | A1* | 7/2004 | Walton ................ H04B 7/0417 370/338 |
| 2004/0218683 | A1* | 11/2004 | Batra .................. H04L 27/0008 375/261 |
| 2004/0252667 | A1* | 12/2004 | Dent .................. H04B 1/707 370/335 |
| 2005/0047515 | A1* | 3/2005 | Walton ................ H04B 7/0417 375/267 |
| 2005/0063378 | A1* | 3/2005 | Kadous ............... H04L 1/0002 370/389 |
| 2005/0113021 | A1* | 5/2005 | Gosieski, Jr. ..... H04L 29/06027 455/3.06 |
| 2005/0129068 | A1 | 6/2005 | Ginzburg et al. |
| 2005/0147079 | A1 | 7/2005 | Lakkis |
| 2005/0180360 | A1* | 8/2005 | Hansen ................ H04B 7/0667 370/334 |
| 2005/0207385 | A1* | 9/2005 | Gorokhov ............ H04L 5/0037 370/344 |
| 2005/0237971 | A1* | 10/2005 | Skraparlis ........... H04B 7/0417 370/329 |
| 2008/0084951 | A1 | 4/2008 | Chen et al. |

OTHER PUBLICATIONS

IEEE P802.11—Task Group N-Meeting Update, http://grouper.ieee.org/groups/802/11/Reports/tgn_update.htm, 7 pages.

IEEE Std 802-2001, "802 IEEE Standard for Local Metropolitan Area Networks: Overview and Architecture," IEEE Computer Society, Mar. 8, 2002, 46 pages.

International Preliminary Report on Patentability for PCT/US2005/012502, dated Oct. 19, 2006. 1 page.

International Search Report and Written Opinion for PCT/US05/12502, dated Aug. 31, 2005, 6 pages.

Jon Rosdahl, "Criteria for Standards Development," (Five Criteria) Nov. 15, 2002, IEEE 802.11-02/799r0, 4 pages.

Jon Rosdahl, "Criteria for Standards Development," (Five Criteria) Nov. 15, 2002, Revision 1: Jan. 16, 2003, IEEE 802.11-02/799r1, 4 pages.

Jon Rosdahl, "Criteria for Standards Development," (Five Criteria) Nov. 15, 2002, Revision 1: Jan. 16, 2003, IEEE 802.11-02/799r2, 5 pages.

Jon Rosdahl, "Criteria for Standards Development," (Five Criteria) Nov. 15, 2002, Revision 4: Mar. 11, 2003, IEEE 802.11-02/799r3, 4 pages.

Jon Rosdahl, "Criteria for Standards Development," (Five Criteria) Nov. 15, 2002, Revision 5: Mar. 13, 2003, IEEE 802.11-02/799r5, 4 pages.

Jon Rosdahl, "Draft PAR for High Throughput Study Group," Nov. 15, 2002, Revision R1: Jan. 16, 2003, IEEE 802.11-02/798r1, 9 pages.

Jon Rosdahl, "Draft PAR for High Throughput Study Group," Nov. 15, 2002, Revision R6: Mar. 13, 2003, IEEE 802.11-02/798r6, 8 pages.

Jones et al., "WwiSE IEEE 802.11n Proposal," IEEE 802.11-04/0935r3, Sep. 16, 2004, 61 pages.

Manoneet Singh, et al. and Bruce Edwards, et al., "WwiSE proposal: High throughput extension to the 802.11," IEEE 11-04-0886-00-000n, Aug. 13, 2004, 75 pages.

Mujtaba et al., "TGn Sync Proposal," IEEE 802.11-04/888r0, Aug. 13, 2004, 38 pages.

Non-Final Office Action on U.S. Appl. No. 13/624,424, dated Oct. 4, 2013, 15 pages.

Notice of Allowance on U.S. Appl. No. 12/760,136, dated Jun. 22, 2012, 5 pages.

Notice of Allowance on U.S. Appl. No. 13/628,424, dated May 21, 2018, 10 pages.

Office Action on U.S. Appl. No. 12/760,136, dated Mar. 29, 2012, 19 pages.

Office Action on U.S. Appl. No. 13/628,424 dated May 22, 2014, 16 pages.

Office Action on U.S. Appl. No. 13/628,424, dated Aug. 21, 2014, 21 pages.

Office Action on U.S. Appl. No. 13/628,424, dated Dec. 27, 2017, 35 pages.

Office Action on U.S. Appl. No. 13/628,424, dated Jan. 16, 2015, 26 pages.

Office Action on U.S. Appl. No. 13/628,424, dated Jul. 5, 2017, 33 pages.

Paulrag A., et al., "Introduction to Space-Time Wireless Communications," May 1, 2003, pp. 27-29, 182-184, 186-187.

Supplementary European Search Report for European Patent Application 05734177.8, dated Apr. 19, 2011, 3 pages.

Syed Aon MUJTABA, "TGn Sync Proposal Technical Specification," IEEE 802.11-04/889r0, Aug. 13, 2004, 149 pages.

* cited by examiner

DUAL MODE COMMUNICATION SYSTEMS AND METHODS

CROSS-REFERENCE TO RELATED PATENT APPLICATIONS

This application is a Continuation of U.S. application Ser. No. 13/628,424 filed Sep. 27, 2012, which is a Continuation of U.S. application Ser. No. 12/760,136 filed Apr. 14, 2010, now U.S. Pat. No. 8,289,835 issued Oct. 16, 2012, which is a Continuation of U.S. application Ser. No. 11, 105,909 filed Apr. 13, 2005, now U.S. Pat. No. 7,729,233 issued Jun. 1, 2010, which claims priority from U.S. Provisional Application No. 60/561,877 filed Apr. 14, 2004, each of which is incorporated herein by reference in its entirety.

BACKGROUND

1. Field

The present disclosure is generally related to communication systems, and, more particularly, is related to wireless communication systems and methods.

2. Related Art

Wireless communication systems are widely deployed to provide various types of communication such as voice, data, and so on. These systems may be based on code division multiple access (CDMA), time division multiple access (TDMA), orthogonal frequency division multiplex (OFDM), or some other multiplexing techniques. OFDM systems may provide high performance for some channel environments. FIG. 1A is a block diagram that illustrates an exemplary single-in, single-out (SISO) orthogonal frequency division multiplexing (OFDM) communication system 100 (herein, SISO system 100) that is compliant with IEEE 802.11 standards. The SISO system 100 comprises a transmitter device 102 and a receiver device 104. The transmitter device 102 comprises a transmit (TX) processor 106, radio circuitry 108, and antenna 110. The receiver device 104 comprises an antenna 112, radio circuitry 114, and receive (RX) processor 116.

The transmitter device 102 comprises well-known circuitry that divides the high-speed data signals into tens or hundreds of lower speed signals and transmits the signals in parallel over respective frequencies within a radio frequency (RF) signal that comprise subcarrier frequencies ("subcarriers"). The frequency spectra of the sub-carriers overlap so that the spacing between them is minimized. The subcarriers are also orthogonal to each other so that they are statistically independent and do not create cross-talk or otherwise interfere with each other. In operation, the transmit processor 106 receives data signals (designated as TX data1 at a defined data rate designated as TX Rate1). The transmit processor 106 encodes and interleaves the data and maps the interleaved data into respective subcarrier channels as frequency domain symbols. Further processing by the transmit processor 106 may result in the insertion of training signals, cyclic extensions (e.g., guard intervals), and additional processing such as inverse fast Fourier transformations (IFFT) and wave shaping. The processed subcarriers are provided to the radio circuitry 108, which provides filtering, modulation, amplification, and upconversion functionality, ultimately resulting in the transmission of data from antenna 110.

At the receiver device 104, the antenna 112 receives the transmitted data, which is provided to radio circuitry 114 to complement the processing that occurred at radio circuitry 108. The data is then provided to receive (RX) processor 116, which provides clock recovery, cyclic extension removal, transformations (e.g., fast Fourier transformation, FFT), demapping, deinterleaving, and decoding to recover the TX data1 as RX data1. Radio circuitry 108 and 114 comprise synthesizers that operate at a single reference or carrier frequency (designated FREQ1).

FIG. 1B is a schematic diagram that illustrates spectrums of the signals processed in the SISO system 100. In 802.11 standards, each OFDM symbol 118 provided by the transmitter device 102 comprises 52 subcarriers (partially shown for brevity) centered at a defined reference or carrier frequency (designated in FIGS. 1A and 1B as FREQ1), with a bandwidth (BW) of approximately 20 mega-Hertz (MHz). The spectrum 120 resulting from processing at the receiver device 104 is centered at the same reference or carrier frequency (FREQ1). Transmitter and receiver devices that implement OFDM processing pursuant to pre-proposed 802.11n standard are often referred to as legacy radios or legacy devices.

In terrestrial communication systems (e.g., a cellular system, a broadcast system, a multi-channel multi-point distribution system (MMDS), among others), a RF modulated signal from a transmitter device may reach a receiver device via a number of transmission paths. The characteristics of the transmission paths typically vary over time due to a number of factors such as fading and multi-path. To provide diversity against deleterious path effects and improve performance, multiple transmit and receive antennas may be used for data transmission. Spatial multiplexing refers to a technique where a transmission channel is divided into multiple "spatial channels" through which independent streams can be transmitted and received via multiple transmit and receive antennas, respectively.

FIG. 2A is a block diagram that illustrates a multiple-input multiple-output (MIMO) OFDM communication system 200 (herein, MIMO system 200). The MIMO system 200 employs multiple transmit antennas and multiple receive antennas for data transmission. Through spatial multiplexing, a MIMO channel formed by the transmit and receive antennas may be decomposed into independent channels. Each of the independent channels is also referred to as a spatial subchannel of the MIMO channel. The MIMO system 200 comprises a transmitter device 202 and receiver device 204. The transmitter device 202 comprises transmit (TX) processors 206 and 212, radio circuitry 208 and 214, and antennas 210 and 216. The radio circuitry 208 and 214 comprise synthesizers that operate at a single reference or carrier frequency (designated FREQ1). The receiver device 204 comprises antennas 218 and 226, radio circuitry 220 and 228 (also comprising synthesizers that operate at a single reference or carrier frequency, FREQ1), a signal separator 222 (e.g., joint interference canceller), and receive (RX) processors 224 and 230. The transmit processors 206 and 212 and the radio circuitry 208 and 214 comprise similar circuitry to that found in and described for transmit processor 106 (FIG. 1A), with the addition of circuitry for implementing spatial multiplexing. The radio circuitry 220 and 228 and receive processors 224 and 230 also share common circuitry with like components shown in and described for receiver device 104 (FIG. 1A). The signal separator 222 is configured to remove interference caused by multiple transmit signals occupying the same bandwidth at the receive antennas 218 and 226, and thus are used to increase the data rate.

FIG. 2B is a schematic diagram that illustrates spectrums of the signals processed in the MIMO system 200. As shown, the OFDM symbols 232 and 234 are comprised of subcarriers centered at the same reference or carrier frequency (FREQ1), each with a bandwidth (BW) of approximately 20 MHz. The spectrum 236 resulting from processing at the receiver device 204 is centered at the same frequency (FREQ1).

Consumers continue to demand higher data rates. Current proposals to a proposed IEEE standard, 802.11n, are at least partially in response to these demands. In the competitive communications industry, designers are challenged to meet these new standards in cost effective ways.

SUMMARY

Embodiments of dual mode communication systems and methods are disclosed. One system embodiment, among others, comprises logic configured to perform spatial multiplexing and expanded bandwidth signaling to data.

One method embodiment, among others, comprises providing spatial multiplexing and expanded bandwidth signaling for a plurality of data, and transmitting the plurality of data from a first transmit antenna and a second transmit antenna.

Other systems, methods, features, and advantages of the disclosed systems and methods will be or become apparent to one with skill in the art upon examination of the following drawings and detailed description. It is intended that all such additional systems, methods, features, and advantages be included within this description and be within the scope of the disclosure.

BRIEF DESCRIPTION OF THE DRAWINGS

Many aspects of the disclosed systems and methods can be better understood with reference to the following drawings. The components in the drawings are not necessarily to scale, emphasis instead being placed upon clearly illustrating the principles of the disclosed systems and methods. Moreover, in the drawings, like reference numerals designate corresponding parts throughout the several views.

DETAILED DESCRIPTION

Disclosed are various embodiments of bandwidth expansion and spatial multiplexing systems and methods, herein referred to as a BES system. Such embodiments of the BES system comprise a dual-use or dual mode architecture that provides for expanded bandwidth signaling that can also be utilized for multiple-input, multiple output (MIMO) spatial multiplexing. In other words, one embodiment of the BES system provides for an architecture where the same or similar hardware is largely reused for MIMO spatial multiplexing and/or expanded bandwidth signaling. MIMO spatial multiplexing can be viewed as stacking multiple channels on top of each other in the frequency domain. Expanded bandwidth techniques can be viewed as stacking multiple channels next to each other in the frequency domain. Each signaling case (MIMO spatial multiplexing and expanded bandwidth) can be viewed as duals of each other.

In this regard, the term "dual" refers to something that has a double character or nature. "Dualism" refers to a quality of state of having a dual nature. In the disclosed embodiments, the dual nature of a transceiver is exploited by tuning to a defined frequency (spatial multiplexing) or different frequency (bandwidth expansion). Such techniques can increase the data rate by spatial multiplexing (use of multiple transmit/receive chains with antennas in a multi-path environment and a signal separator in the receiver device), while enabling reuse of the same architecture as a bandwidth expansion radio device if the synthesizers of the respective transmit/receive chains are tuned to different, non-overlapping frequencies rather than the same frequency. For example, on the receiver end, a signal separator is implemented in spatial multiplexing, whereas in bandwidth expansion, a signal separator is not needed and the receive filters of a receiver device are tuned to the distinct frequencies. By providing the ability to operate in either or both configurations using the same architecture, demand for increased data rates can be fulfilled using legacy radios or devices in a cost effective manner.

Although described in the context of an OFDM system, it should be understood that embodiments of the BES system 300 may be implemented using non-OFDM signaling methods, such as code division multiple access (CDMA), global system for mobile communications (GSM) in cellular communications, among other techniques and communication environments.

Figure 1A:
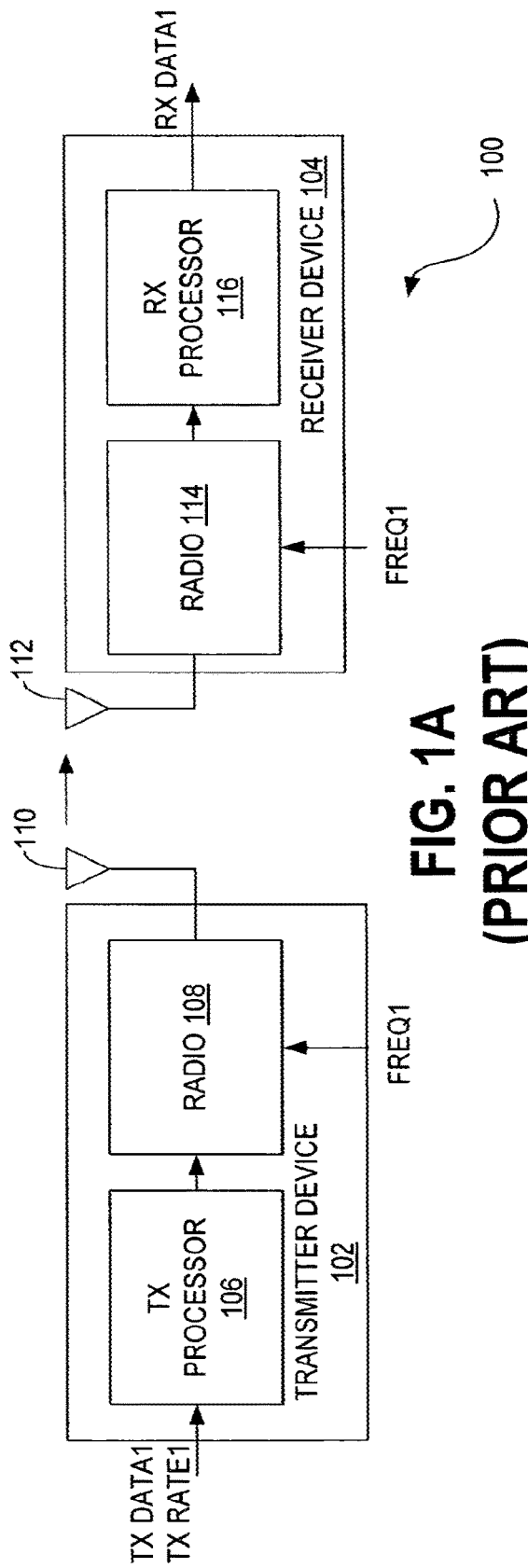
FIG. 1A is a block diagram that illustrates an exemplary single-in, single-out (SISO) orthogonal frequency division multiplexing (OFDM) communication system.
Figure 1B:
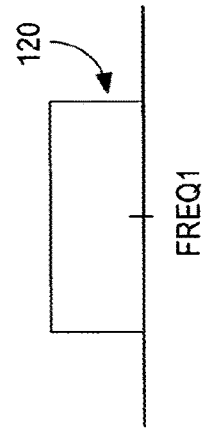
FIG. 1B is a schematic diagram that illustrates spectrums of the signals processed in the SISO OFDM communication system shown in FIG. 1A.
Figure 2A:
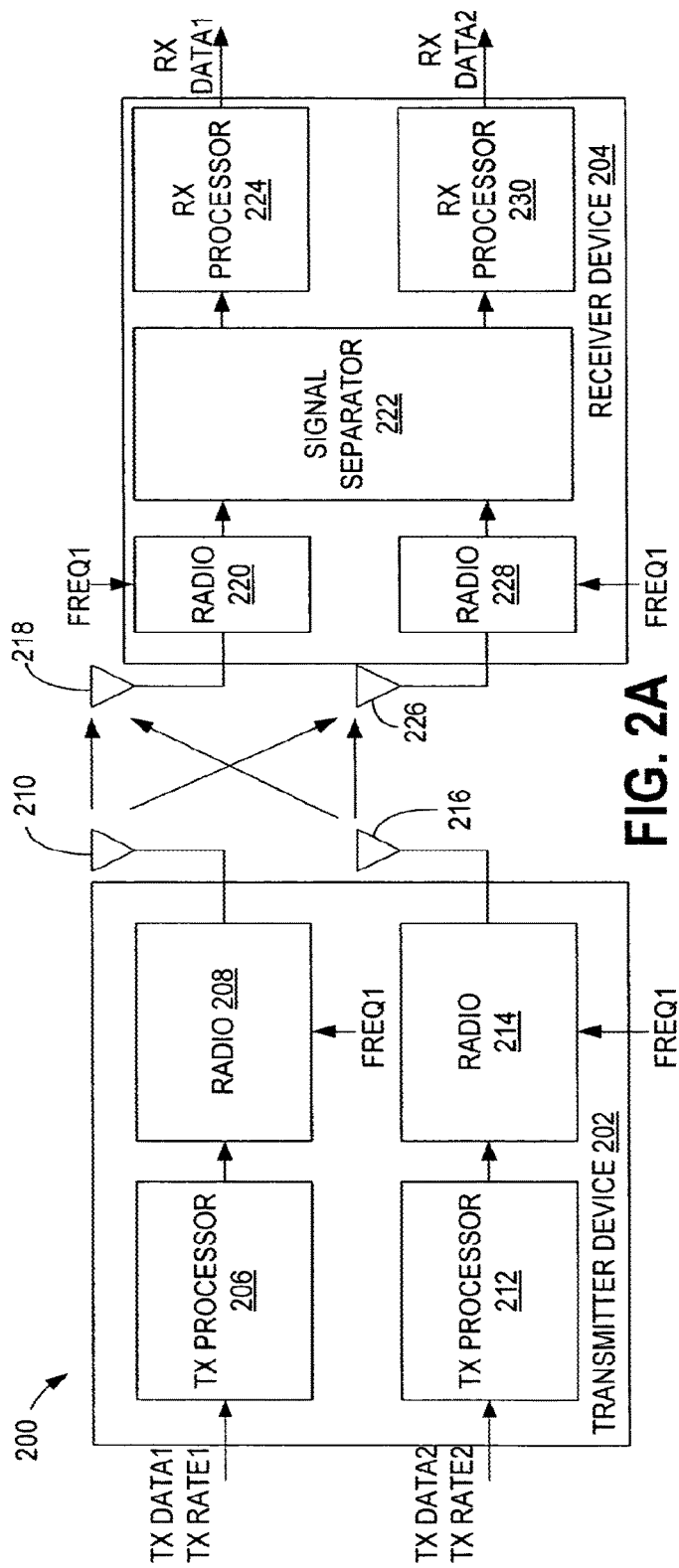
FIG. 2A is a block diagram that illustrates a multiple-input multiple-output (MIMO) OFDM communication system.
Figure 2B:
FIG. 2B is a schematic diagram that illustrates spectrums of the signals processed in the MEMO OFDM communication system shown in FIG. 2A.
Figure 3A:
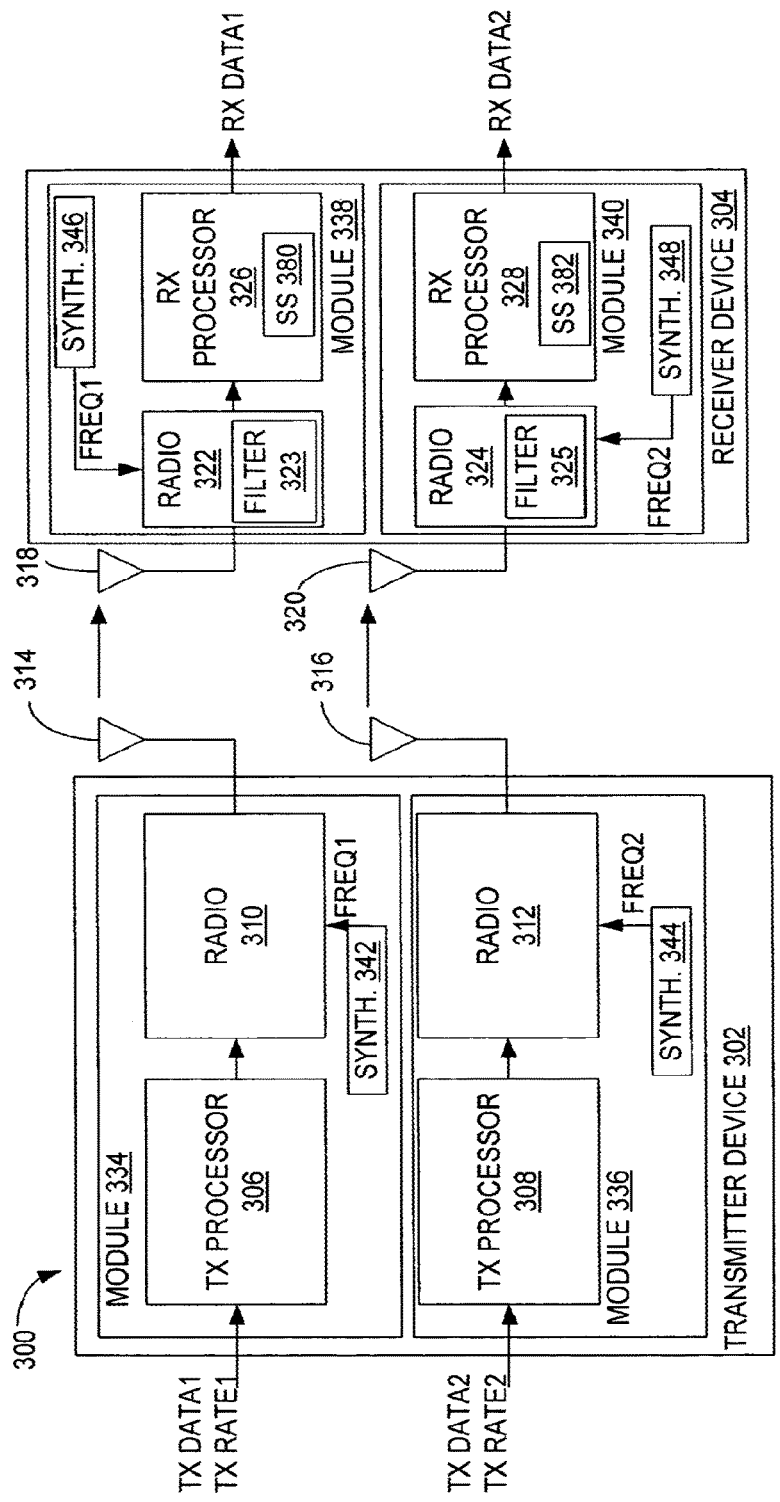
FIG. 3A is a block diagram that illustrates an embodiment of a bandwidth expansion and spatial multiplexing (BES) system.

FIG. 3A is a block diagram that illustrates an embodiment of BES system 300. The BES system 300 may also be referred to as a dual mode communication system. In one embodiment, the BES system 300 comprises a multiple-input multiple-output (MIMO) orthogonal frequency division multiplexing (OFDM) communication system that implements bandwidth expansion and/or spatial multiplexing. The BES system 300 comprises a transmitter device 302 and a receiver device 304. The transmitter device 302 may include functionality of the receiver device 304, and the receiver device 304 may comprise functionality of the transmitter device 302. Further, the transmitter device 302 and/or the receiver device 304 may each be embodied in many wireless communication devices, including computers (desktop, portable, laptop, etc.), consumer electronic devices (e.g., multi-media players), compatible telecommunication devices, personal digital assistants (PDAs), or any other type of network devices, such as printers, fax machines, scanners, hubs, switches, routers, set-top boxes, televisions with communication capability, etc. The transmitter device 302 comprises two modules 334 and 336. Module 334 comprises a transmit (TX) processor 306, radio circuitry 310, antenna 314, and synthesizer 342. Module 336 comprises a transmit (TX) processor 308, radio circuitry 312, antenna 316, and synthesizer 344. Although synthesizers 342 and 344 are shown separate from the radio circuitry 310 and 312, in some embodiments, the synthesizers 342 and/or 344 may be incorporated into the radio circuitry 310 and 312, respectively, among other locations.

Transmit processors 306 and 308 encode and interleave the incoming data (designated TX data1 and TX data2 at TX data rate1 and TX data rate2, respectively). Transmit processors 306 and 308 map the interleaved data into respective subcarrier channels as frequency domain symbols, and include further processing for the insertion of training signals, cyclic extensions (e.g., guard intervals), and inverse fast Fourier transformation (IFFT) and wave shaping. The processed subcarriers are provided to the radio circuitry 310 and 312, which provides filtering, modulation, and amplification functionality. Radio circuitry 310 and 312 receive reference or carrier frequency signals FREQ1 and FREQ2 from synthesizers 342 and 344, respectively, resulting in transmission of signals at distinct reference or carrier frequencies. By using separate reference or carrier frequencies, the transmitted signals can be easily separated by receive filters at the receiver device 304.

The receiver device 304 comprises modules 338 and 340. Module 338 comprises an antenna 318, radio circuitry 322 comprising receive filter 323 among other components, synthesizer 346, and receive (RX) processor 326. The receive processor 326 comprises a signal separator 380. Module 340 comprises an antenna 320, radio circuitry 324 comprising receive filter 325 among other components, synthesizer 348, and receive (RX) processor 328. The receive processor 328 comprises a signal separator 382. In some embodiments, other components may be used to separate the data subcarriers of the signals. Although synthesizers 346 and 348 are shown separate from the radio circuitry 322 and 324, in some embodiments, the synthesizers 346 and/or 348 may be incorporated into the radio circuitry 322 and 324, respectively. At the receiver device 304, the antennas 318 and 320 receive the transmitted data, and provide the same to radio circuitry 322 and 324. The synthesizers 346 and 348 provide downconversion functionality using reference or carrier frequencies FREQ1 and FREQ2, respectively, which complements the processing that occurred at radio circuitry 310 and 312. In other words, the signals transmitted from antennas 314 and 316 are separated by frequency at radio circuitry 322 and 324, respectively. With distinct frequencies of operation (FREQ1 and FREQ2), the signal separators 380 and 382 may be bypassed or disabled, since the receive filters 323 and 325 are used to receive the separate carrier frequencies and reject other channels. The corresponding downconverted signals are provided to receive processors 326 and 328 to recover the original data as RX data1 and RX data2. Receive processors 326 and 328 provide clock recovery, cyclic extension removal, transformation (e.g., fast Fourier transformation, FFT), demapping, deinterleaving, and decoding functionality.

One or more components of the BES system 300 can be implemented using digital circuitry, analog circuitry, or a combination of both. Also, one or more components of the BES system 300 can be implemented in hardware, software, firmware, or a combination thereof. If implemented in hardware, the one or more components of the BES system 300 can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

If implemented partly or wholly in software, the one or more components of the BES system 300 can be comprised of software or firmware that is stored in a memory and that is executed by a suitable instruction execution system.

Figure 3B:
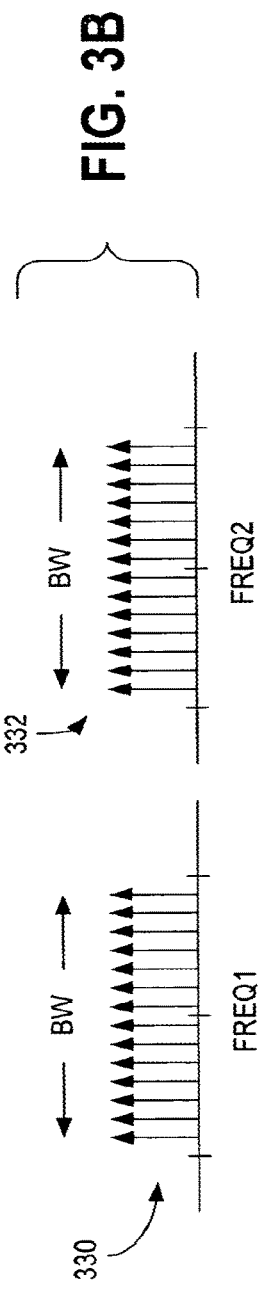
FIG. 3B is a schematic diagram that illustrates an exemplary spectrum of the BES system shown in FIG. 3A.

FIG. 3B is a schematic diagram that illustrates exemplary spectrums for OFDM symbols of the BES system 300 shown in FIG. 3A. As shown, the OFDM symbols 330 and 332 comprise subcarriers of equal bandwidth (BW) (e.g., 20 mega-Hertz (MHz) each), but at distinct reference or carrier frequencies (FREQ1 and FREQ2) as opposed to the conventional mechanisms of using the same reference or carrier frequency.

Figure 3C:
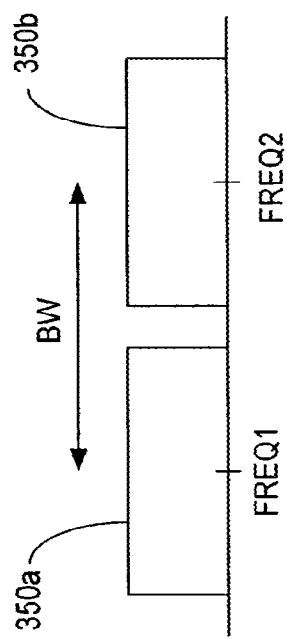
FIGS. 3C-3D are schematic diagrams that illustrate exemplary adjacent and non-adjacent spectrums of the BES system shown in FIG. 3A.
Figure 3D:
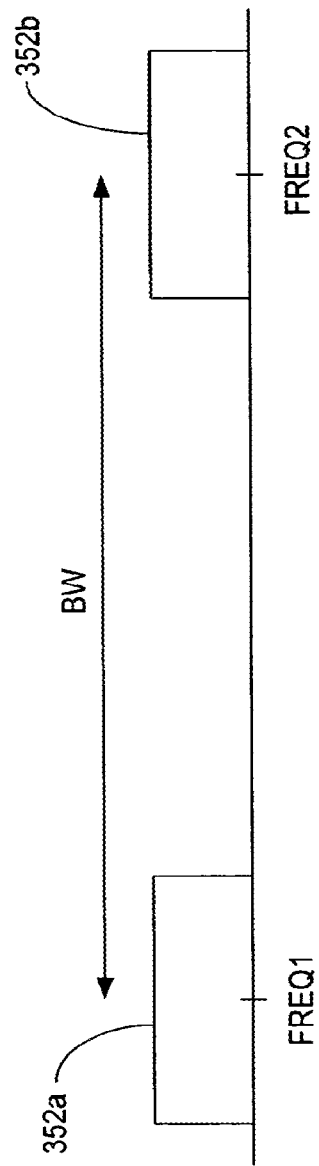

FIGS. 3C-3D are schematic diagrams that illustrate exemplary adjacent and non-adjacent spectrums, respectively, of the BES system 300 shown in FIG. 3A. FIG. 3C illustrates adjacent spectrums 350a and 350b (or channels) as generated during the processing of the received signals at the receiver device 304 (FIG. 3A). FIG. 3D illustrates non-adjacent frequency spectrums 352a and 352b (or channels) as generated during the processing of the received signals at the receiver device 304. The bandwidth of such spectrums 352a, 352b can be much greater than, for example, 20 MHz. Such an expanded bandwidth technique may provide several benefits, such as finding a free or available channel (since there is no requirement that the channels be adjacent). Further, in proposals to the proposed 802.11n standard, 40 MHz systems are contemplated. In such an environment, it may be difficult to find a contiguous 40 MHz channel bandwidth. By providing the ability to implement non-adjacent channels, the new proposed standard can be accommodated as well.

Both frequency spectrums 350a, 350b and 352a, 352b reveal non-overlapping, non-interfering spectrums that result in a multi-fold increase in the data rate (e.g., by using multiple 20 MHz channels, a doubling of the bandwidth can result in a two-fold increase in data rate). In other words, the BES system 300 (FIG. 3B) has increased the data rate by transmitting the OFDM symbols side by side (separate channels). Further, in this implementation, the operation of a signal separators 380 and 382 is not needed (since by definition, signals at distinct frequencies are separate). Also, by implementing expanded bandwidth techniques, the signaling overhead used to train a signal separator can be eliminated.

Figure 4:
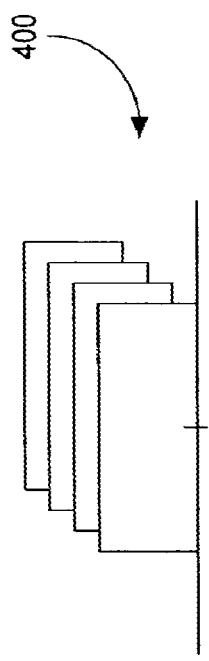
FIG. 4 is a schematic diagram that illustrates fourth order spatial multiplexing and first order expanded bandwidth as implemented by an embodiment of a BES system.
Figure 5:
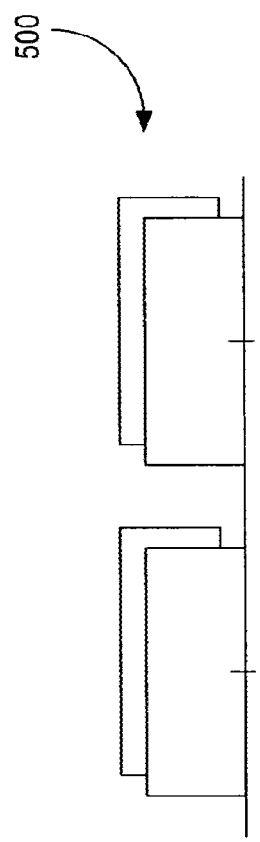
FIG. 5 is a schematic diagram that illustrates second order spatial multiplexing and second order expanded bandwidth as implemented by an embodiment of a BES system.
Figure 6:
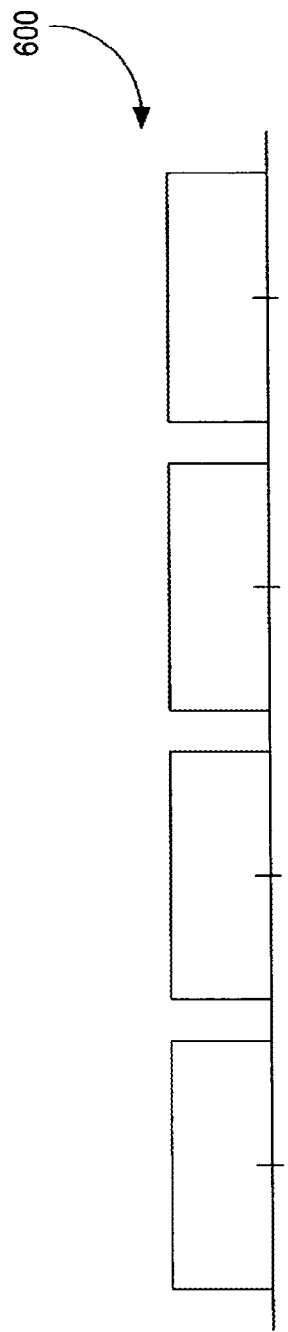
FIG. 6 is a schematic diagram that illustrates first order spatial multiplexing and fourth order expanded bandwidth as implemented by an embodiment of a BES system.

FIGS. 4-6 illustrate the flexibility the embodiments of a BES system (similar to BES system 300, FIG. 3) can provide. Such different configurations may be manually configured based upon a known user need, or automatically configured based upon operational conditions (e.g., number of users, signal-to-noise ratio, multipath environment, interference, country where used, etc.). A media access controller (MAC, not shown) may determine the mode of operation (spatial, extended bandwidth, combinations), or in some embodiments, the controlling application (e.g., multi-media player control processor) may control the mode of operation. For example, FIG. 4 illustrates a frequency spectrum 400 corresponding to a 4×4 MIMO spatial multiplexing BES system operating in a 20 MHz channel, implemented using fourth order spatial multiplexing and first order expanded bandwidth. In other words, the data rate is increase above the base rate (e.g., 20 MHz channels), and is achieved using only spatial multiplexing and no bandwidth expansion (e.g., greater than 20 MHz). In one embodiment, a BES system can be implemented using 2×2 spatial multiplexing distributed across two 20 MHz channels, as shown in FIG. 5 as a second order spatial multiplexing, second order expanded bandwidth spectrum 500. For the configurations shown in FIGS. 4 and 5, the signal separators 380 and 382 (FIG. 3A) are operational since multiple signals are occupying the same frequency channel and thus self-interfering. For example, for the second order spatial multiplexing configuration shown in FIG. 5, the signal separators 380 and 382 separate two signals. For the fourth order spatial multiplexing configuration shown in FIG. 4, the signal separators 380 and 382 separate four signals. In one embodiment, a BES system can be implemented using first order spatial multiplexing and fourth order expanded bandwidth spectrum 600, as shown in FIG. 6. In such a configuration, the signal separators 380 and 382 need not be operational, and thus training signals corresponding to the operation of the signal separators 380 and 382 can be bypassed.

Note that in some embodiments, gap filling may be provided between two spectrums with extra subcarriers, which may increase the composite data rate. For example, referring to FIG. 3C, subcarriers may fill in the gap between spectrums 350*a* and 350*b*.

Although described in the context of distinct synthesizers for each respective radio, in some embodiments, a single, adjustable synthesizer may be used for multiple transmit modules or multiple receiver modules.

Figure 7:
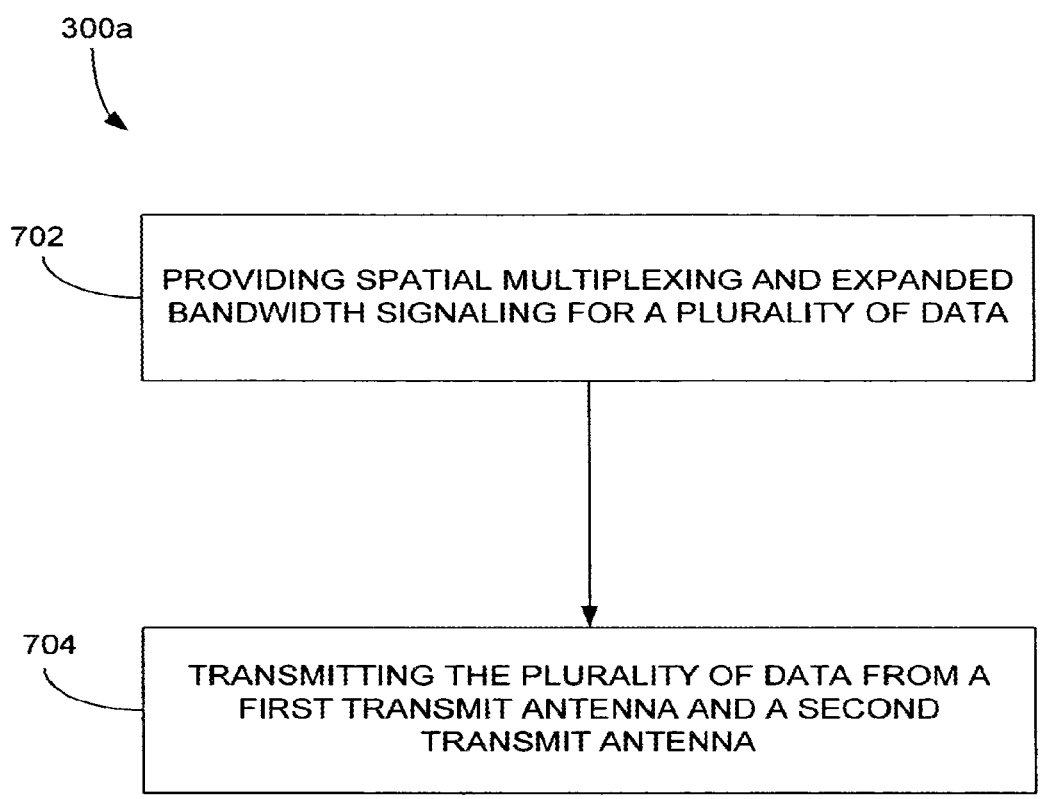
FIG. 7 is a flow diagram that illustrates a BES method embodiment.

As will be appreciated from the above description, one embodiment of a BES method 300*a* is illustrated in FIG. 7. Any process descriptions or blocks in flow charts should be understood as representing modules, segments, or portions of code which include one or more executable instructions for implementing specific logical functions or steps in the process, and alternate implementations are included within the scope of the preferred embodiment of the present invention in which functions may be executed out of order from that shown or discussed, including substantially concurrently or in reverse order, depending on the functionality involved, as would be understood by those reasonably skilled in the art of the present invention.

As shown in FIG. 7, the BES method 300*a* comprises providing spatial multiplexing and expanded bandwidth signaling for a plurality of data (702), and transmitting the plurality of data from a first transmit antenna and a second transmit antenna (704). It should be emphasized that the above-described embodiments of the present disclosure, particularly, any "preferred" embodiments, are merely possible examples of implementations, merely set forth for a clear understanding of the principles of the disclosed systems and methods. Many variations and modifications may be made to the above-described embodiment(s) without departing substantially in scope. All such modifications and variations are intended to be included herein within the scope of this disclosure.

What is claimed is:

1. A method comprising:
    generating first mode transmit symbols at a first transmitter and a second transmitter of a transmitting device;
    transmitting in a first mode using the first mode transmit symbols from the first transmitter and the second transmitter on separate data streams in a common frequency spectrum band over a plurality of antennas;
    generating second mode transmit symbols at the first transmitter and the second transmitter of the transmitting device;
    transmitting in a second mode the second mode transmit symbols from the first transmitter over a first set of antennas across a first frequency spectrum; and
    transmitting in the second mode using the second mode transmit symbols from the second transmitter over a second set of antennas across a second frequency spectrum, wherein the first frequency spectrum does not overlap with the second frequency spectrum.

2. The method of claim 1, wherein each frequency spectrum comprises a plurality of frequency subbands.

3. The method of claim 1, wherein the first transmitter and the second transmitter generate and transmit symbols during the same period of time.

4. The method of claim 1, wherein when transmitting in the first mode, the first transmitter and the second transmitter generate and transmit symbols within the same frequency channel.

5. The method of claim 1, wherein when transmitting in the second mode the first transmitter and the second transmitter generate and transmit symbols in adjacent frequency channels.

6. The method of claim 1, wherein when transmitting in the second mode the first transmitter and the second transmitter modulate and transmit symbols in non-adjacent frequency channels.

7. The method of claim 1, wherein the first set of antennas is different from the second set of antennas.

8. The method of claim 1, wherein the first set of antennas comprises a plurality of antennas.

9. A method comprising:
    receiving, in a first mode, first mode symbols with a first receiver and a second receiver operating in a common frequency spectrum band via a plurality of antennas;
    receiving, in a second mode, second mode symbols with the first receiver over a first set of antennas operating in a first frequency spectrum; and
    receiving, in the second mode, second mode symbols with the second receiver over a second set of antennas operating in a second frequency spectrum, wherein the first frequency spectrum does not overlap with the second frequency spectrum.

10. The method of claim 9, wherein each frequency spectrum comprises a plurality of frequency subbands.

11. The method of claim 9, wherein the first receiver and a second receiver receive and process symbols during the same period of time.

12. The method of claim 9, wherein when receiving in the first mode the first receiver and the second receiver jointly process separate received data signals located within the same frequency channel.

13. The method of claim 9, wherein when receiving in the second mode the first receiver and the second receiver jointly process separate received data signals located in adjacent frequency channels.

14. The method of claim 9, wherein when receiving in the second mode the first receiver and the second receiver jointly process separate received data signals located in non-adjacent frequency channels.

15. The method of claim 9, wherein the first set of antennas is different from the second set of antennas.

16. The method of claim 9, wherein the first set of antennas comprises a plurality of antennas.

17. An article of manufacture including a non-transitory computer-readable medium having instructions stored thereon that, upon execution by a computing device, cause the computing device to perform the operations comprising:

generating first mode transmit symbols at a first transmitter and a second transmitter of a transmitting device;

transmitting in a first mode using the first mode transmit symbols from the first transmitter and the second transmitter on separate data streams in a common frequency spectrum band over a plurality of antennas;

generating second mode transmit symbols at the first transmitter and the second transmitter of the transmitting device;

transmitting in a second mode the second mode transmit symbols from the first transmitter over a first set of antennas across a first frequency spectrum; and transmitting in the second mode using the second mode transmit symbols from the second transmitter over a second set of antennas across a second frequency spectrum, wherein the first frequency spectrum does not overlap with the second frequency spectrum.

18. The article of manufacture of claim 17, wherein each frequency spectrum comprises a plurality of frequency sub-bands.

19. The article of manufacture of claim 17, wherein the instructions, upon execution by a computing device, cause the computing device to perform the operation comprising transmitting symbols from the first transmitter and the second transmitter during the same period of time.

20. The article of manufacture of claim 17, wherein the instructions, upon execution by a computing device, cause the computing device to perform the operation comprising, when transmitting in the first mode, the first transmitter and the second transmitter generate and transmit symbols within the same frequency channel.

21. The article of manufacture of claim 17, wherein the instructions, upon execution by a computing device, cause the computing device to perform the operation comprising, when transmitting in the second mode, the first transmitter and the second transmitter generate and transmit symbols in adjacent frequency channels.

22. The article of manufacture of claim 17, wherein the instructions, upon execution by a computing device, cause the computing device to perform the operation comprising, when transmitting in the second mode, the first transmitter and the second transmitter generate and transmit symbols in non-adjacent frequency channels.

23. The article of manufacture of claim 17, wherein the first set of antennas is different from the second set of antennas.

24. The article of manufacture of claim 17, wherein the first set of antennas comprises a plurality of antennas.

25. An article of manufacture including a non-transitory computer-readable medium having instructions stored thereon that, upon execution by a computing device, cause the computing device to perform the operations comprising:

receiving, in a first mode, first mode symbols with a first receiver and a second receiver operating in a common frequency spectrum band via a plurality of antennas;

receiving, in a second mode, second mode symbols with the first receiver over a first set of antennas across a first frequency spectrum; and receiving, in the second mode, second mode symbols with the second receiver over a second set of antennas operating in a second frequency spectrum, wherein the first frequency spectrum does not overlap with the second frequency spectrum.

26. The article of manufacture of claim 25, wherein each frequency spectrum comprises a plurality of frequency sub-bands.

27. The article of manufacture of claim 25, wherein the instructions, upon execution by a computing device, cause the computing device to perform the operation comprising receiving symbols with the first receiver and the second receiver during the same period of time.

28. The article of manufacture of claim 25, wherein the instructions, upon execution by a computing device, cause the computing device to perform the operation comprising, when receiving in the first mode, the first receiver and the second receiver jointly process separate received data signals located within the same frequency channel.

29. The article of manufacture of claim 25, wherein the instructions, upon execution by a computing device, cause the computing device to perform the operation comprising, when receiving in the second mode, the first receiver and the second receiver jointly process separate received data signals located in adjacent frequency channels.

30. The article of manufacture of claim 25, wherein the instructions, upon execution by a computing device, cause the computing device to perform the operation comprising, when receiving in the second mode, the first receiver and the second receiver jointly process separate received data signals located in non-adjacent frequency channels.

31. The article of manufacture of claim 25, wherein the first set of antennas is different from the second set of antennas.

32. The article of manufacture of claim 25, wherein the first set of antennas comprises a plurality of antennas.

* * * * *